United States Patent
Deng et al.

(10) Patent No.: US 11,276,677 B1
(45) Date of Patent: Mar. 15, 2022

(54) CONCURRENT OPTIMIZATION OF 3D-IC WITH ASYMMETRICAL ROUTING LAYERS

(71) Applicant: Cadence Design Systems, Inc., San Jose, CA (US)

(72) Inventors: Liqun Deng, Shanghai (CN); Pinhong Chen, Saratoga, CA (US); Richard M. Chou, Cupertino, CA (US); Chin-Chih Chang, San Jose, CA (US); Miao Liu, Shanghai (CN); Yufeng Luo, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/789,296

(22) Filed: Feb. 12, 2020

(51) Int. Cl.
| | |
|---|---|
| *G06F 30/394* | (2020.01) |
| *G06F 30/398* | (2020.01) |
| *H01L 27/02* | (2006.01) |
| *H01L 25/065* | (2006.01) |
| *G06F 111/04* | (2020.01) |
| *G06F 111/00* | (2020.01) |
| *G06F 30/39* | (2020.01) |

(52) U.S. Cl.
CPC ........ *H01L 27/0207* (2013.01); *G06F 30/394* (2020.01); *G06F 30/398* (2020.01); *H01L 25/0657* (2013.01); *G06F 30/39* (2020.01); *G06F 2111/00* (2020.01); *G06F 2111/04* (2020.01); *H01L 2924/14* (2013.01)

(58) Field of Classification Search
USPC ......................................................... 716/110
See application file for complete search history.

(56) References Cited

U.S. PATENT DOCUMENTS

| | | | |
|---|---|---|---|
| 7,526,739 B2 | 4/2009 | Mcilrath | |
| 8,032,857 B2 | 10/2011 | Mcilrath | |
| 8,209,649 B2 | 6/2012 | Mcilrath | |
| 8,266,560 B2 | 9/2012 | Mcilrath | |
| 8,650,516 B2 | 2/2014 | Mcilrath | |
| 9,275,185 B2 | 3/2016 | Mcilrath | |
| 9,552,454 B2* | 1/2017 | Chowdhury | G06F 30/39 |
| 2011/0055791 A1* | 3/2011 | Gao | G06F 30/392 |
| | | | 716/131 |
| 2015/0135147 A1* | 5/2015 | Emirian | G06F 30/398 |
| | | | 716/105 |

* cited by examiner

*Primary Examiner* — Bryce M Aisaka
(74) *Attorney, Agent, or Firm* — Vista IP Law Group, LLP

(57) ABSTRACT

Disclosed is an approach to implement multi-die concurrent placement, routing, and/or optimization across multiple dies. This permits the multiple dies to be modeled as a single 3D space. Instead of being limited to a 2D plane, a cell can be placed to the area of any of the dies without splitting the netlist beforehand.

21 Claims, 14 Drawing Sheets

US 11,276,677 B1

CONCURRENT OPTIMIZATION OF 3D-IC WITH ASYMMETRICAL ROUTING LAYERS

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. The design of an integrated circuit transforms a circuit description into a geometric description called a layout. The process of converting specifications of an integrated circuit into a layout is called the physical design.

Chip designers often use electronic design automation (EDA) software tools to assist in the design process. Chip design using EDA software tools generally involves an iterative process whereby the chip design is gradually perfected. A top-down design methodology is commonly employed using hardware description languages (HDLs), such as Verilog or VHDL for example, by which the designer creates an integrated circuit by hierarchically defining functional components of the circuit, and then decomposing each component into smaller and smaller components.

The various components of an integrated circuit are initially defined by their functional operations and relevant inputs and outputs. From the HDL or other high-level description, the actual logic cell implementation is typically determined by logic synthesis, which converts the functional description of the circuit into a specific circuit implementation. The logic cells are then "placed" (e.g., given specific coordinate locations in the circuit layout) and "routed" (e.g., wired or connected together according to the designer's circuit definitions). The placement and routing software routines generally accept as their input a flattened netlist that has been generated by the logic synthesis process. Various optimizations may then occur to revise the design to improve aspects such as timing performance of the integrated circuit.

Traditionally, the above-described process is performed individually for a single die in a two-dimensional integrated circuit (2D-IC). However, more recent electronic designs now include three-dimensional integrated circuit designs (3D-IC) that include multiple dies in a stacked arrangement. The problem is that conventional approaches that were previously taken to optimize each individual die for a 2D-IC design may not produce adequate or optimal results when applied to 3D-IC designs.

Therefore, there is a need for an improved approach to implement electronic designs that provide improved results and performance for 3D-IC designs.

SUMMARY

Embodiments of the invention provide an improved method, system, and computer program product to implement multi-die concurrent placement, routing, and/or optimization across multiple dies. This permits the multiple dies to be modeled as a single 3D space. Instead of being limited to a 2D plane, a cell can be placed to the area of any of the dies without splitting the netlist beforehand. The placement and optimization algorithm can take the advantage of the 3D stacking, with its correspondingly larger solution space, to identify and implement an optimal result.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As discussed above, the process of optimizing an integrated circuit is typically performed individually for a single die in a 2D-IC design, and that approach is similarly applied in conventional systems even when optimizing a 3D-IC design that includes multiple dies. However, such approaches are suboptimal in many situations.

Figure 1:
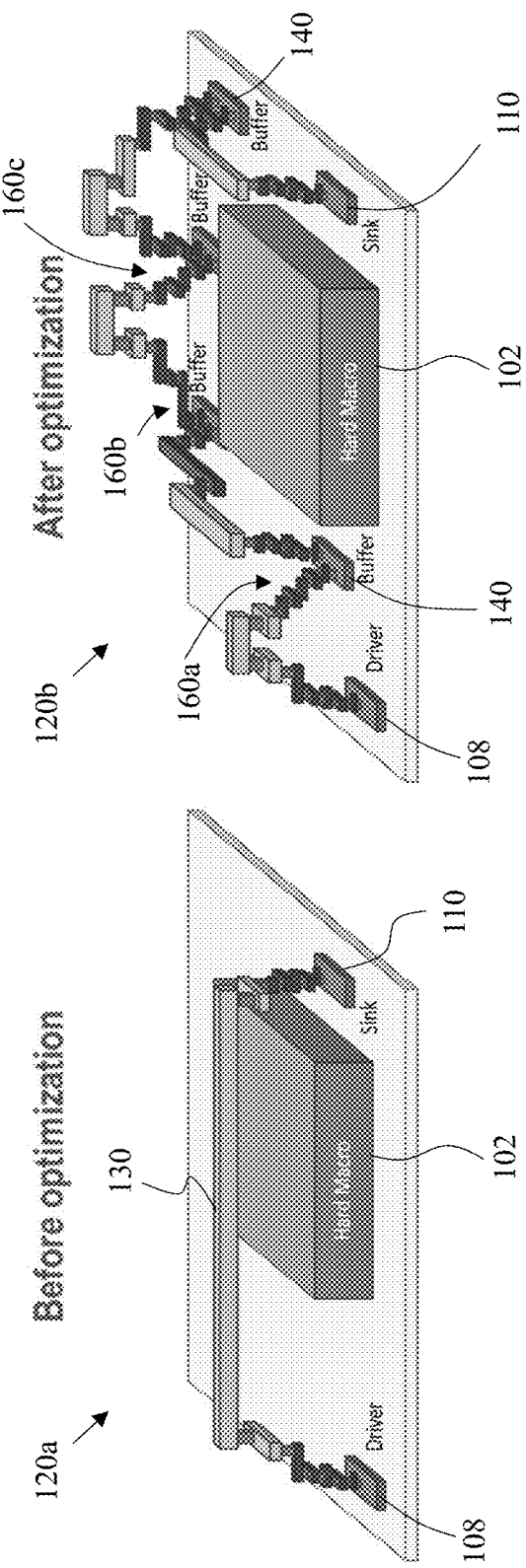
FIG. 1 illustrates 2D optimization.

To explain, consider the layout for an example integrated circuit design as shown in FIG. 1, where it is desired to route a net from a driver 108 to a sink 110. One or more hard macros 102 may be located between the driver 108 and the sink 110. The hard macros are, for example, IP blocks or on-chip memory, which may occupy a much bigger area than standard cells. As shown at 120*a*, a net 130 may be routed from the driver 108 to the sink 110 by utilizing one or more wires on metal layers of the die that are different from the layer where the driver 108, sink 110, and hard macro 102 have been placed. Here for example, the wires have been routed on upper metal layers while the driver 108, sink 110, and hard macro 102 are all located on the die's substrate.

Optimizations may need to occur to ensure that the circuit design meets certain timing requirements. As shown at 120*b*, the conventional optimization technology is to insert buffers 140 (and/or inverters) on the same 2D floorplan as the logic cells, where they occupy significant amount of placeable area and thus increase the cell density. This means that logic cells may need to be pushed aside. These drawbacks make the design even harder to close for timing purposes. In high density areas or on a hard macro (which typically equals to 100% density), there may not even be any location suitable to insert a buffer.

In addition, the conventional optimization approaches also consume significant amounts of routing resources. Before optimization as shown at 120*a*, the net comes out from the driver cell 108 and is usually promoted to upper metal layers by implementing via stacking. This is because lower metal layers usually have much higher resistance and are the most congested. But after optimization as shown at 120*b*, since the buffers 140 are located on the silicon substrate, the net has to travel up and down between the upper metal layer and the device to connect the buffers. The net's lower metal layer routings and stack vias may therefore occupy and consume large amounts more routing resource after optimization.

Figure 2:
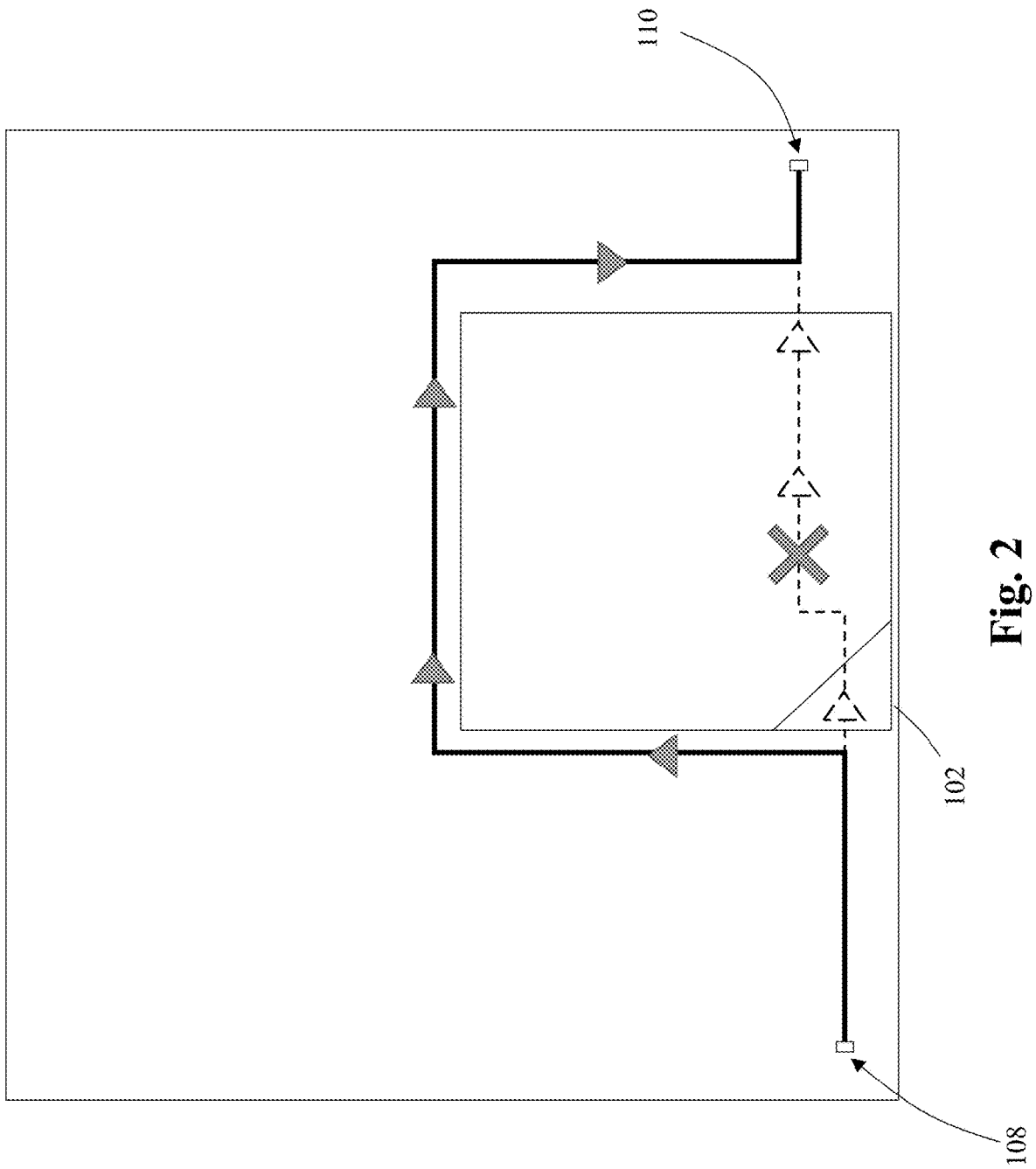
FIG. 2 illustrates an example design.

The blockage presented by hard macro may also create other problems for the EDA tool. For example, as shown in FIG. 2, the hard macro may require the implementation of a very long net to avoid the blockage. In addition, if a long net crosses a large hard macro, it may not be possible to insert buffers along this net to address any timing issues, as the buffers will overlap with the macro. Moreover, the hard macro also blocks multiple routing layers above them. Thus, the routing resource above the macro is much more limited than the standard cell area.

With embodiments of the invention, the above-described problems are resolved by implementing the placement resources and routing resources of multiple dies that are combined and modeled as a single 3D space. Instead of being limited to a 2D plane, a cell can be placed to the area of any of the dies without splitting the netlist beforehand. The placement and optimization algorithm can take the advantage of the 3D stacking, with its correspondingly larger solution space, to identify and implement an optimal result.

Figure 3:
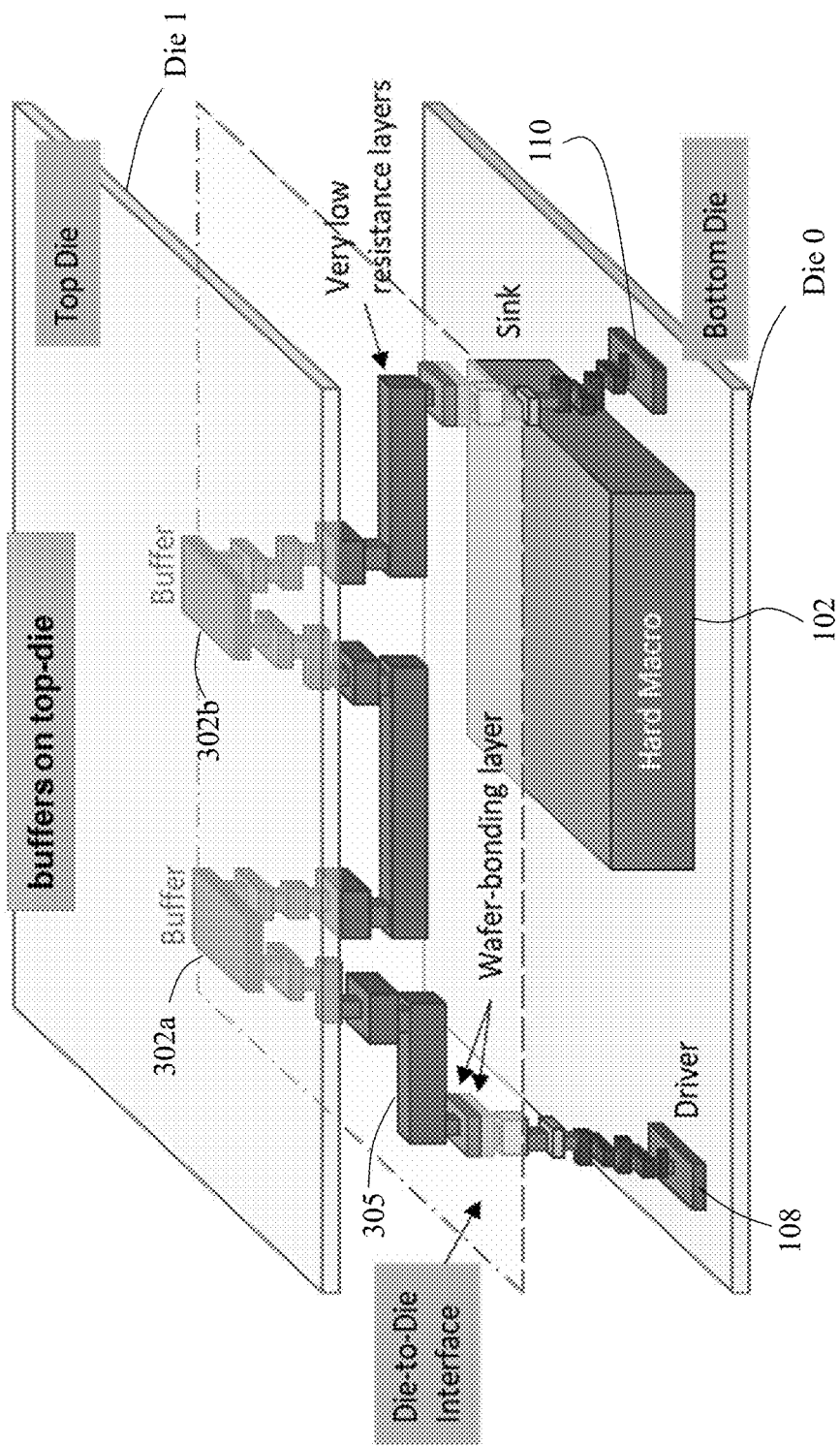
FIG. 3 illustrates an improved approach to implement electronic designs, where concurrent-optimization is performed on 3D-IC designs with asymmetric routing layers.

FIG. 3 illustrates an improved approach to implement electronic designs, where concurrent-optimization is performed on 3D-IC designs with asymmetric routing layers. In the inventive approach according to some embodiments, the placement resources and routing resources of multiple dies (e.g., die 0 and die 1) are combined and modeled as a single 3D space. This allows the electronic optimization process to concurrently optimize on both a lower die and an upper die for a given design. As such, instead of being limited to routing on a 2D plane, design/logic cells can be placed to the area of any of the dies without splitting the netlist beforehand. The placement and optimization algorithm take the advantage of the 3D stacking and has bigger solution space to find the optimal result.

As illustrated in the example design of FIG. 3, the driver 108 and sink 110 are located on the substrate of die 0, with a hard macro 102 being located on die 0 in a manner that block a direct path between the driver 108 and sink 110.

The netlist may include various wires/vias that traverse to higher metal layers of die 0 to avoid the blockage presented by hard macro 102. The problem with prior approaches is that since routing is done on a 2D die-by-die basis, the netlist in prior 2D approaches would have necessarily needed to traverse back down through the various layers of die 0 to insert buffers onto die 0, then back up again for more wires, then back down again for another buffer, etc. The reason for the layer promotions with conventional design tools is because the lower metal layers have higher costs pertaining to, for example, resistance and capacitance of the design. As such, the conventional optimization process will attempt to promote routes to upper metal layer as shown in 120*b* of FIG. 1, where the route will traverse through multiple layers of metal layers and vias from the first metal layer (M1 or metal 1) to the upper metal layers, and back down again to connect to objects (e.g., buffers) on the lower metal layers. This disadvantage is illustrated in 120*b* of FIG. 1 where 160*a* illustrates a first location that requires excessive layer traversal downward to a buffer followed by layer traversal upwards through many layers to wiring, followed by locations 160*b*, and 160*c* where this occurs again and again. This results in numerous detours that must be taken in the vertical directions. The many additional vias that need to be inserted presents even further resistance that is imposed upon the already-long nets.

With the inventive embodiment, the optimization will concurrently consider the layers on both die 0 and die 1 for the location of design objects, instead of being limited only to the layers on die 0. To buffer a net on the bottom die 0, the optimizer has the flexibility to insert one or more buffers 302*a* and 302*b* on the top die 1 as shown in FIG. 3. This approach therefore allows the design to avoid excessive layer promotion on the bottom die 0. As illustrated in FIG. 3, the netlist therefore includes a wire 305 that extends to buffer 302*a* on die 1.

To save additional costs, the top die 1 may have fewer numbers of routing layers than the bottom die 0, as the top die mainly provides locations to locate buffers and/or non-critical logic. In addition, the process technology node used on the top die may be different than the process technology used on the bottom die (e.g., larger feature sizes for the technology/process nodes on the upper die). For example, the bottom die 0 may be using a 7 nm process node, while the top die 1 may be using a 28 nm process node. This saves on overall costs for the design due to the less expensive process technology for the top die. In addition, the performance of the design can be improved since the top die 1 having the low-cost process node technology will use larger wires, larger buffers, etc., which provides lowered resistance for the routing paths and potentially the need to use less buffers. This approach also has the added benefit of being able to avoid having to detour around congested areas or the hard macro 102 on the bottom die.

The die-to-die interface in some embodiments may use wafer-bonding or similar technology so that the I/O density between the two dies is high enough to provide sufficient number of connections for the cross-die traffic.

Figure 4:
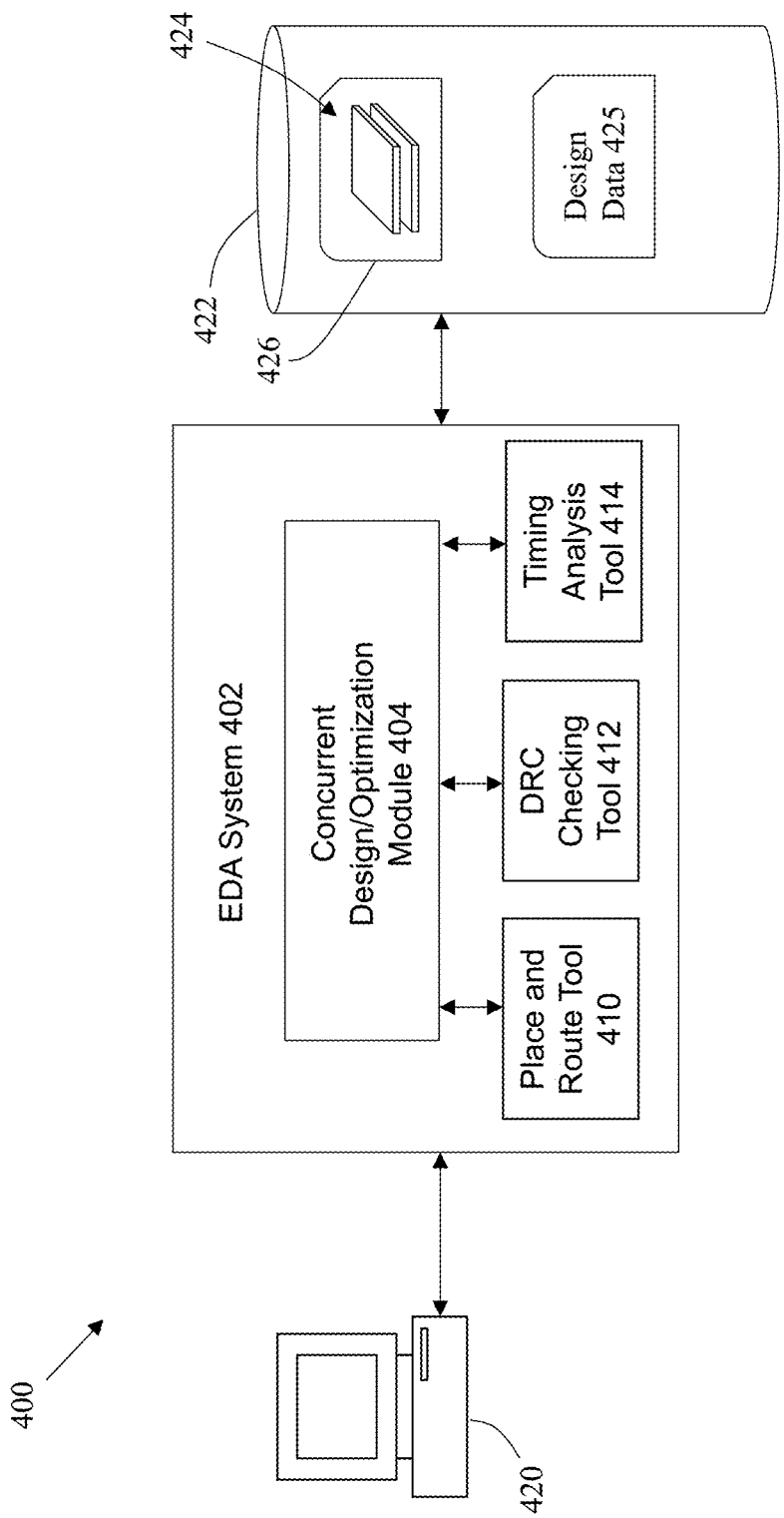
FIG. 4 illustrates an example system which may be employed in some embodiments of the invention.

FIG. 4 illustrates an example system 400 which may be employed in some embodiments of the invention. System 400 may include one or more users that interface with and/or operate a computing system to control and/or interact with system 400 using a computing station 420. Such users include, for example, design engineers or verification engineers. The computing system comprises any type of computing station 420 that may be used to operate, interface with, or implement one or more EDA systems/applications 402. Examples of such computing systems include for example, servers, workstations, personal computers, or remote computing terminals connected to a networked or cloud-based computing platform. The computing system may comprise one or more input devices for the user to provide operational control over the activities of the system 400, such as a mouse or keyboard to manipulate a pointing object.

The one or more EDA systems/applications 402 are operated to perform concurrent multi-die optimization upon design data 425 to generate an optimized design 426, where the optimized design 426 is optimized concurrently over multiple tiers of dies 424. A concurrent design/optimization module 404 is provided within the EDA system 402 to perform concurrent multi-die optimization. In some embodiments, the concurrent design/optimization module 404 is implemented in conjunction with a place and route tool 410, which implements the physical design (placement and/or routing) of for the electronic product.

The EDA system 402 may further include a DRC (design rule check) checking tool 412 to check for any rules violations that may exist for any of the placement and/or routing configurations generated by place and route tool 410. Design rules are a series of parameters provided by semiconductor manufacturers, specifying geometric and connectivity restrictions to ensure sufficient margins to account for variability in semiconductor manufacturing processes. The DRC checking tool is applied to verify the correctness of any designs, and to identify possible issues that may affect overall yield or reliability for the design. A timing analysis tool 414 may also be provided to analyze the expected timing performance of the electronic design. While not shown in this figure, additional tools and/or modules may be employed to perform other aspects of EDA processing for an electronic design. For example, an extraction tool may be provided to extract and analyze capacitance data for the electronic design. As another example, an EM (electromigration) analysis tool may be provided to analyze electromigration effects upon the electronic design. As yet another example, a power analysis tool may be provided to analyze expected power consumption for the electronic design.

The data generated by EDA system 402, including for example, electronic design data 425 and optimized physical design data 426, may be stored in a computer readable storage medium 422. The computer readable storage medium 422 includes any combination of hardware and/or software that allows for ready access to the data that is located at the computer readable storage medium 422. For example, computer readable storage medium 422 could be implemented as computer memory and/or hard drive storage operatively managed by an operating system, and/or remote storage in a networked storage device, such as networked attached storage (NAS), storage area network (SAN), or cloud storage. The computer readable storage medium 422 could also be implemented as an electronic database system having storage on persistent and/or non-persistent storage.

Figure 5:
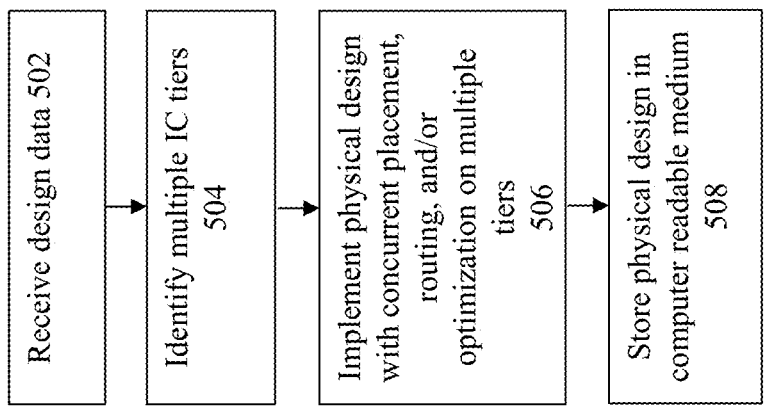
FIG. 5 shows a high-level flowchart of an approach to implement some embodiments of the invention.

FIG. 5 shows a high level flowchart of an approach to implement some embodiments of the invention. At 502, the EDA system receives design data to be optimized. The design data may include an electronic design that has already undergone implementation as a physical design, but for which one or more aspects of the design still needs to be changed to improve the performance and/or configuration of the design. For example, timing analysis may identify the fact that the physical design needs to be optimized to improve timing performance, e.g., because the timing slack for the design is deemed excessive based upon the results of performing timing analysis.

At 504, the EDA system will recognize multiple IC tiers for which the optimization process may concurrently optimize. For example in a two-tier 3D design, the lower die 0 and the upper die 1 will be identified. In a three-tier design, the lower die 0, the middle die 1, and the upper die 2 are identified. The embodiments of the invention may be applied to a 3D-IC design having any number of tiers. In addition, the orientation(s) of the dies are identified. As will be described in more detail below, various permutations of die orientations may be used to implement and optimize the electronic design. For example, the dies may be arranged face-to-face, face-to-back, or back-to-back, and may be rotated in different directions with respect to other dies.

At 506, the physical design is implemented with concurrent optimization across the multiple dies. In one embodiment, this is performed combining the multiple layers from each of the multiple dies together as a single set of layers to be considered together for optimization. For example, consider a lower die 0 that has ten metal layers, which in some embodiments are identified as M1, M2, . . . M10 (or identified as M1@0, M2@0, . . . M10@0). The upper die 1 may have an additional four metal layers, which may be identified as M1@1, M2@1, M2@1, and M4@1. Instead of treating each die separately (and thus having each set of metal layers separately optimized by the EDA system), in the present embodiment the ten layers from die 0 and the four layers from die 1 are considered as a single set of fourteen layers over which the electronic design may therefore be concurrently implemented and optimized.

As noted in the previous paragraph, some embodiments use a certain nomenclature to refer to the different tiers, such as "cell@tier number" and "layer@tier number". For example, metal layer 1 at tier 1 can be identified as "M1@1" and a buffer cell BUF1 at tier 1 can be identified as BUF1@1". The lowest tier can be considered tier 0. This approach allows the tool to easily recognize the instances and cells at any given tier level, even if the different tiers share the same cell name. In some embodiments, to preserve backwards compatibility, the nomenclature for structures on tier 0 does not use the "@0" portion. Therefore, metal layer 1 on tier 0 is identified simply as "M1" rather than "M1@0". In an alternative embodiment, both or either approach can be to recognize structures on tier 0.

Thereafter, at 508, the optimized electronic design is stored into a computer readable medium. The optimized design may also be displayed to the user on an electronic display device. In some embodiments, for cloud-based EDA systems, the EDA tools and/or storage facility for the electronic design may be located in a remote cloud-based compute/storage system.

Figure 6:
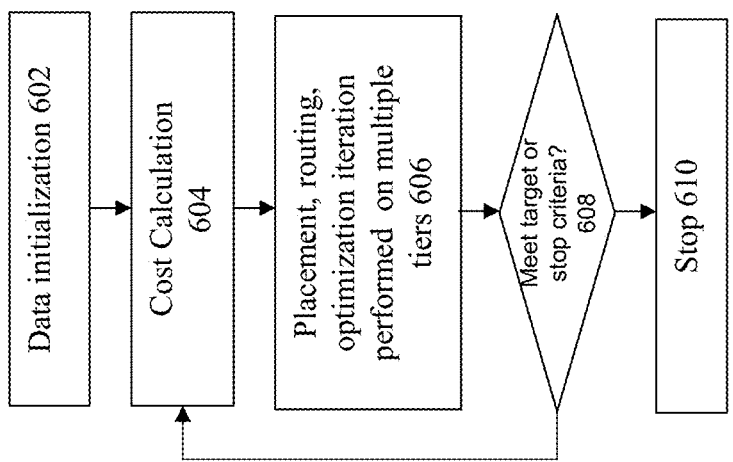
FIG. 6 shows a more detailed flowchart of an approach to implement placement and optimization according to some embodiments.

FIG. 6 shows a more detailed flowchart of an approach to implement placement and optimization according to some embodiments. At 602, data initialization is performed for the electronic design. This step receives and/or generates the pre-optimized electronic design that is to be optimized.

At 604, a cost calculation is performed for the electronic design across the multiple dies. The cost of different placement/routing factors on the instances and nets under optimization are considered to determine the next iteration of the design that should be implemented, where the costs are determined by analyzing placement/routing factors across the instances and nets on multiple dies. Examples of such factors include: (a) the density of the multiple dies; (b) the wirelength on the multiple dies; (c) the routing topology and layer assignments on the multiple dies; (d) the timing slack of the design, including any cross-die timing paths; and/or (e) the power consumption, the IR-drop, and/or the thermal implications of the electronic design.

At 606, a placement, routing, and/or optimization iteration is performed for the design across the multiple dies. The cost determinations may be used to guide the next iteration of the placement and routing processing. For example, if the lower die has a high density (e.g., because of a large hard macro on the substrate of the lower die) and the upper die has a lower density (e.g., because the upper die is kept relatively open), then the density costs of inserting objects such as buffers on the lower die will be higher than the costs of the same buffer objects on the upper die, and hence for at least this factor the EDA tool is configured to more likely locate the buffer on the upper die. This cost-based approach can be taken to implement both placement and routing across the multiple dies in step 606.

At 608, a determination is made whether to stop (at 610) or whether to proceed with another iteration of the optimization processing. Various criteria may be used to determine whether another iteration is needed. Examples of such criteria include: (a) whether the design meets the timing target (e.g., timing slack is equal to zero), with the processing stopped at 610 if the timing requirements are met; and/or (b) whether the previous iteration has improved timing in any way, with processing stopped if there are no further improvements in timing. If it is determined that another iteration is needed, the process proceeds back to step 604 to repeat the above steps.

Figure 7:
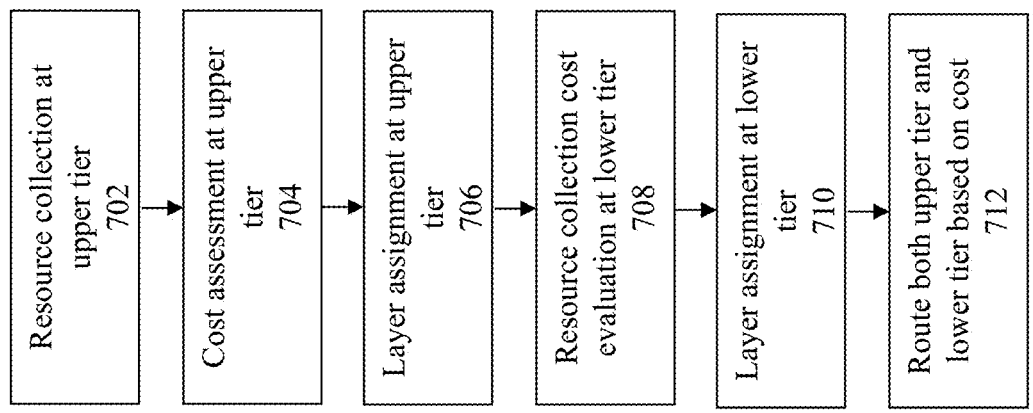
FIG. 7 shows a detailed flowchart of an approach to implement routing according to some embodiments of the invention.

FIG. 7 shows a detailed flowchart of an approach to implement routing according to some embodiments of the invention. At 702, resource collection is made for the upper tier. For example, gcell resource collection is performed for the upper tier. At 704, a cost assessment is made for the upper tier. For example, gcell cost assessment may be performed using the cost factors that were identified above. Next, at 706, layer assignment is performed at the upper tier.

At 708, resource collection cost evaluation is performed for the lower tier, e.g., for the gcell for the lower tier. This may be based at least in part on the layer assignments that had previously been made for the upper tier, e.g., using the cost factors that were previously discussed such as congestion, vias, layer, and/or other costs. At 710, layer assignments are performed at the lower tier.

At 712, both the upper tier and the lower tier are routed. The routing at the upper and lower tiers may be implemented based upon the lowest cost routing options. It is noted that preferences may exist for certain routing decisions. For example, a preference may be imposed for the upper tier, where upper tier metals that have lower resistance are considered preferable for routing over layer assignments at the lower tier.

In some embodiment, for F2F (face-to-face) stacking, the routing algorithm is very much the same as the traditional 2D-IC routing, but includes merging the layers of the top tier and bottom tier. The traditional router typically includes 2 steps:

Global route—assign track in a gcell based on track resource supply and demand; and Detail route—route the actual wire and resolve DRC.

For F2B or B2B (back-to-back) stacking, one difference that exists is that when the routing crosses the substrate, a TSV (via through the substrate) is used rather than a regular via. It is noted that TSV is usually relatively large and has a relatively larger pitch. The TSV also has a keepout zone around it where other standard cells cannot be placed. Therefore, the router should be aware of these additional constraints when dropping the TSV onto the layout.

Figure 8:
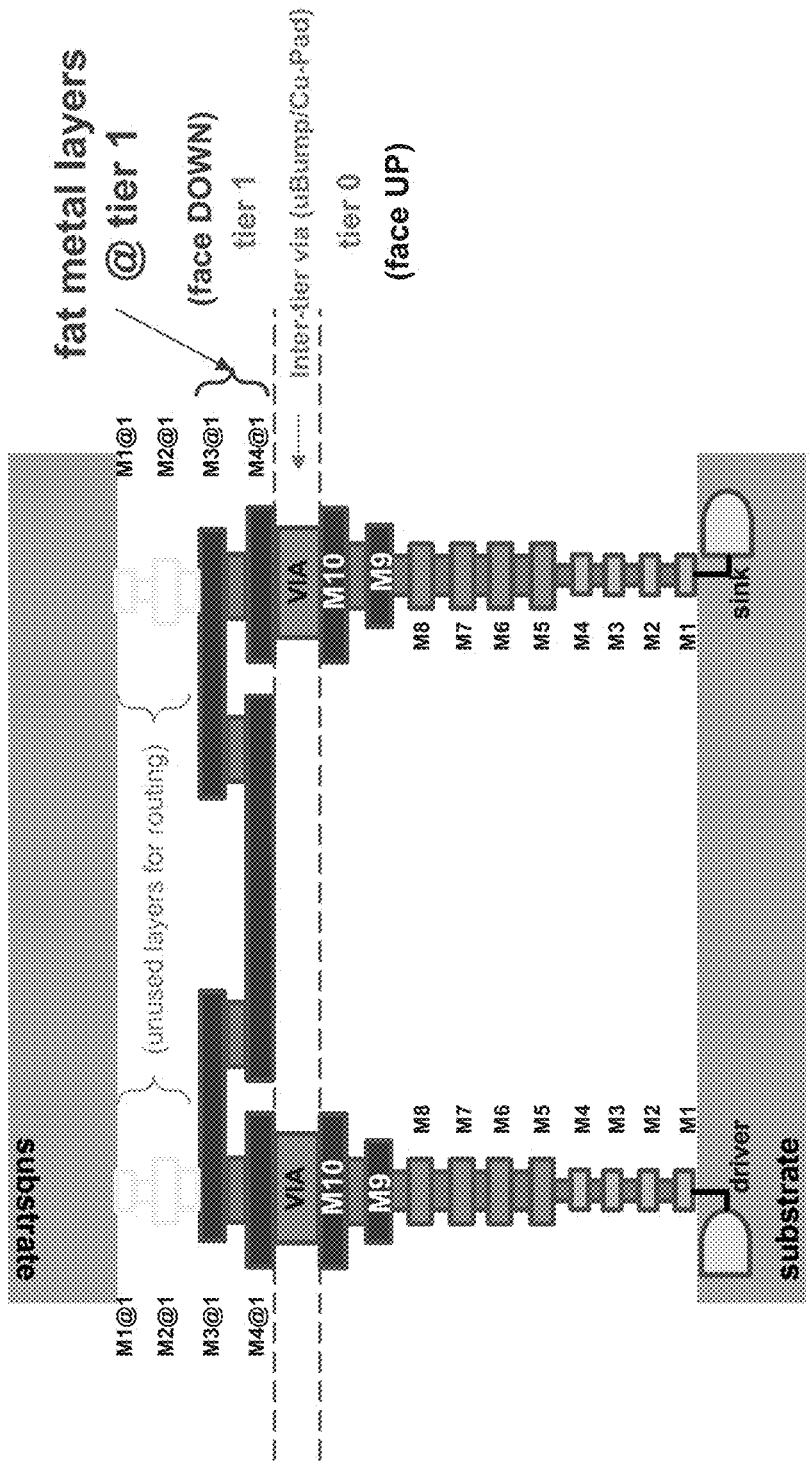
FIGS. 8 and 9 provide example illustrations of 3D-IC face-to-face designs that are concurrently optimized across multiple dies.
Figure 9:
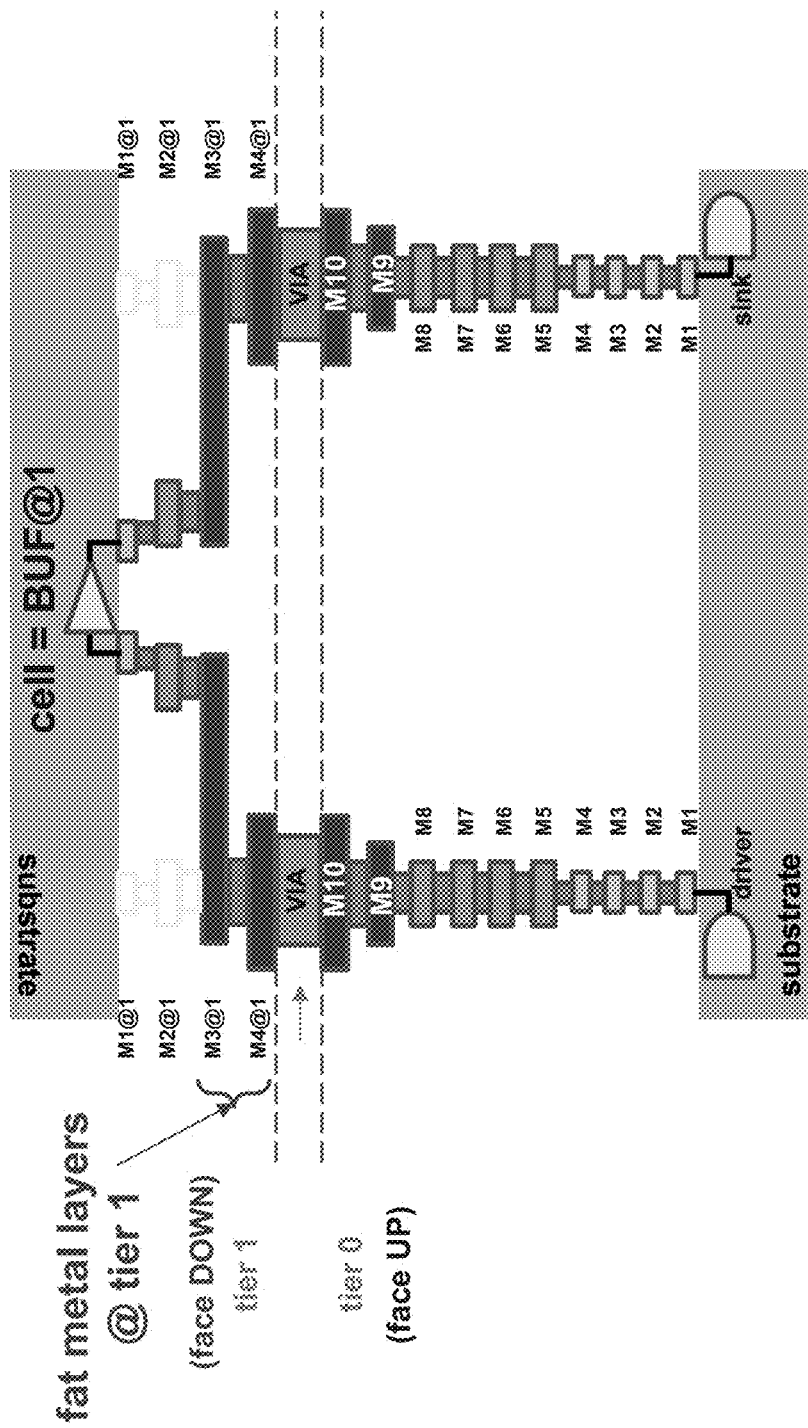

FIGS. 8 and 9 provide example illustrations of 3D-IC face-to-face designs that are concurrently optimized across multiple dies. Here, the lower die and the upper die are facing each other.

FIG. 8 illustrates multi-tier long net routing for the two dies, where the fat metal layers of the upper tier die are used for routing. In particular, the metals layers M3@1 and M4@1 on the upper tier die 1 are used to implement routing between the driver and the sink that are located on the substrate of the lower tier die 0.

FIG. 9 illustrates multi-tier long net buffering, where buffering is implemented only at the upper tier. In particular, the buffer has been located on the substrate of the upper tier die 1. This approach therefore minimizes layer traversing, since the routing at M3@1 only needs to traverse a small number of metal layers to the substrate of die 1, rather than traversing the numerous metal layers on the lower tier die 0 is previous approaches that required the buffers to be located on the same substrate as the driver and sink.

Figure 10:
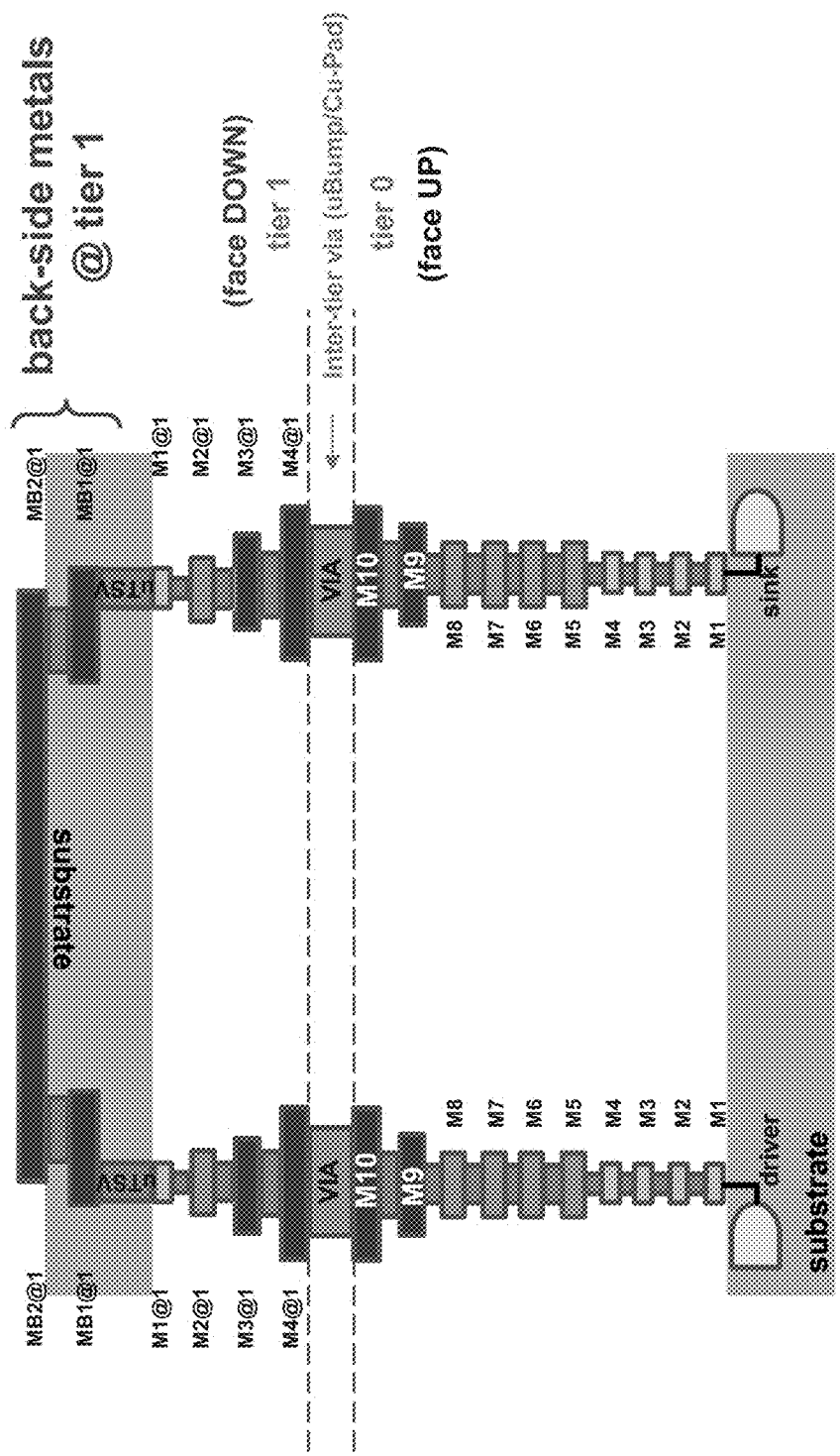
FIGS. 10 and 11 provide example illustrations of 3D-IC face-to-face designs that use the back-side metals for the upper die.
Figure 11:
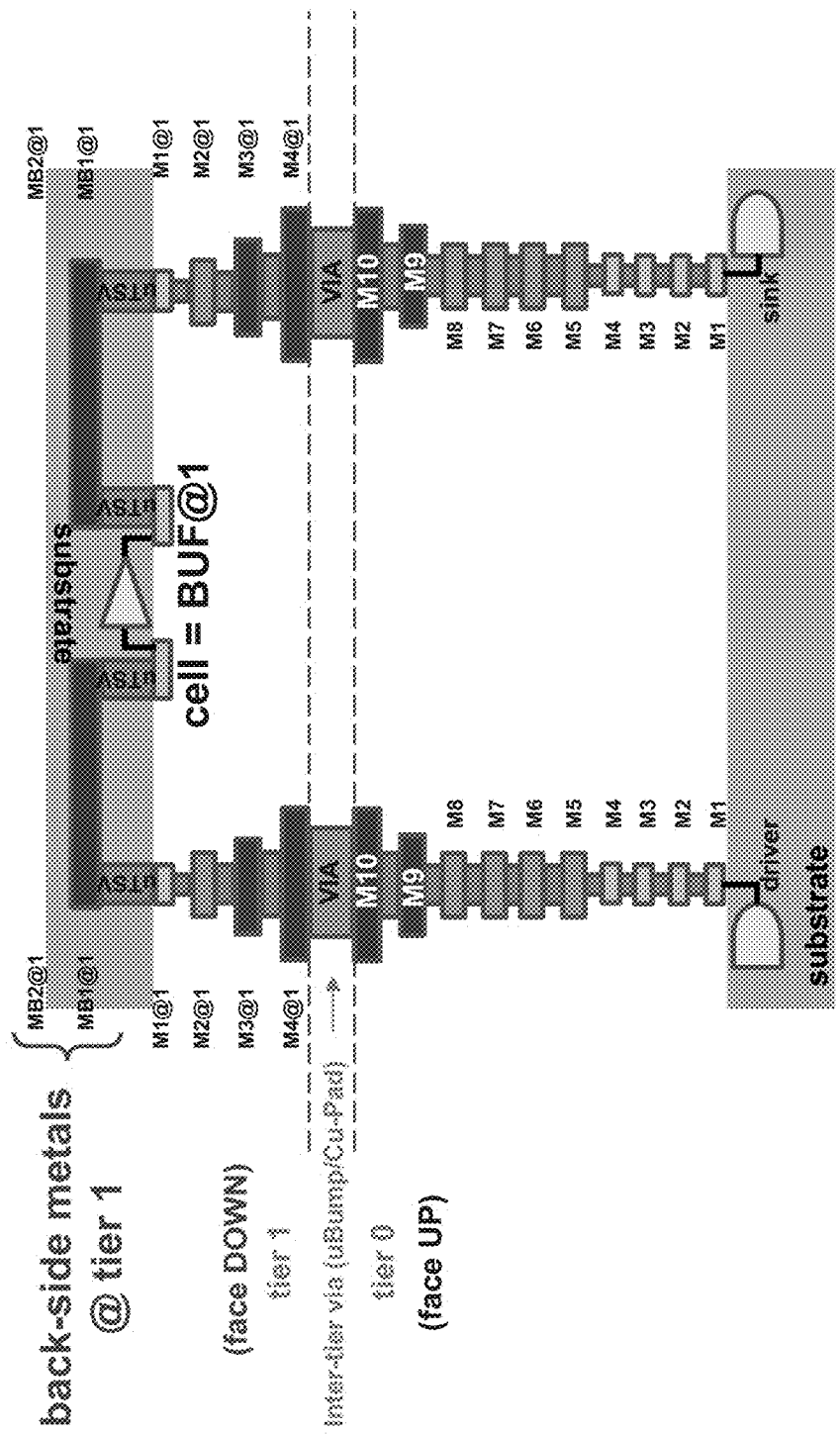

FIGS. 10 and 11 provide example illustrations of 3D-IC face-to-face designs that use the back-side metals for the upper die. Here, the lower die and the upper die are facing each other.

FIG. 10 illustrates multi-tier long net routing for the two dies, where routing structures may be utilized on the back-side metals of the upper tier. Here, the fat metal layers of the upper tier die are used for routing, where the back-side layers MB1@1 and MB2@1 on the upper tier die 1 are used to implement routing structures. The disadvantage of this approach over the approach of FIG. 8 is that micro TSVs are used to connect to these back-side metal layers, which increases the cost and/or may affect performance. It is noted that the back-side metals may be either inside or outside the substrate of the upper tier.

FIG. 11 illustrates multi-tier long net buffering, where buffer structures may be inserted on the back-side metals of the upper tier. Here, the buffer has been located using the back-side metal layers of the substrate of the upper tier die 1. In particular, the routing and buffering structures make use of the back-side metal layers MB1@1 and MB2@1 on the upper tier die 1.

Figure 12:
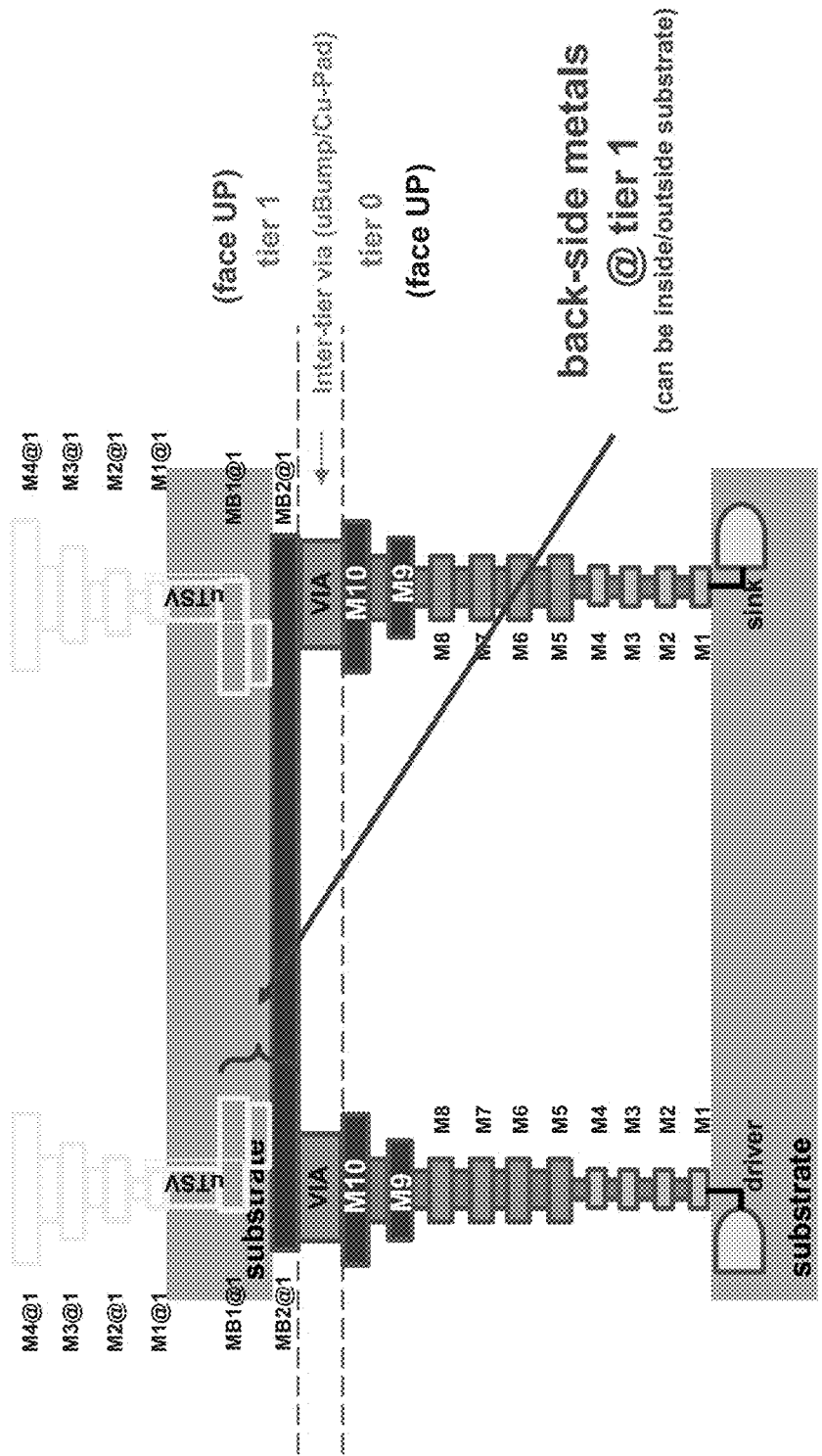
FIGS. 12 and 13 provide example illustrations of 3D-IC face-to-back designs that use the back-side metals of the upper die.
Figure 13:
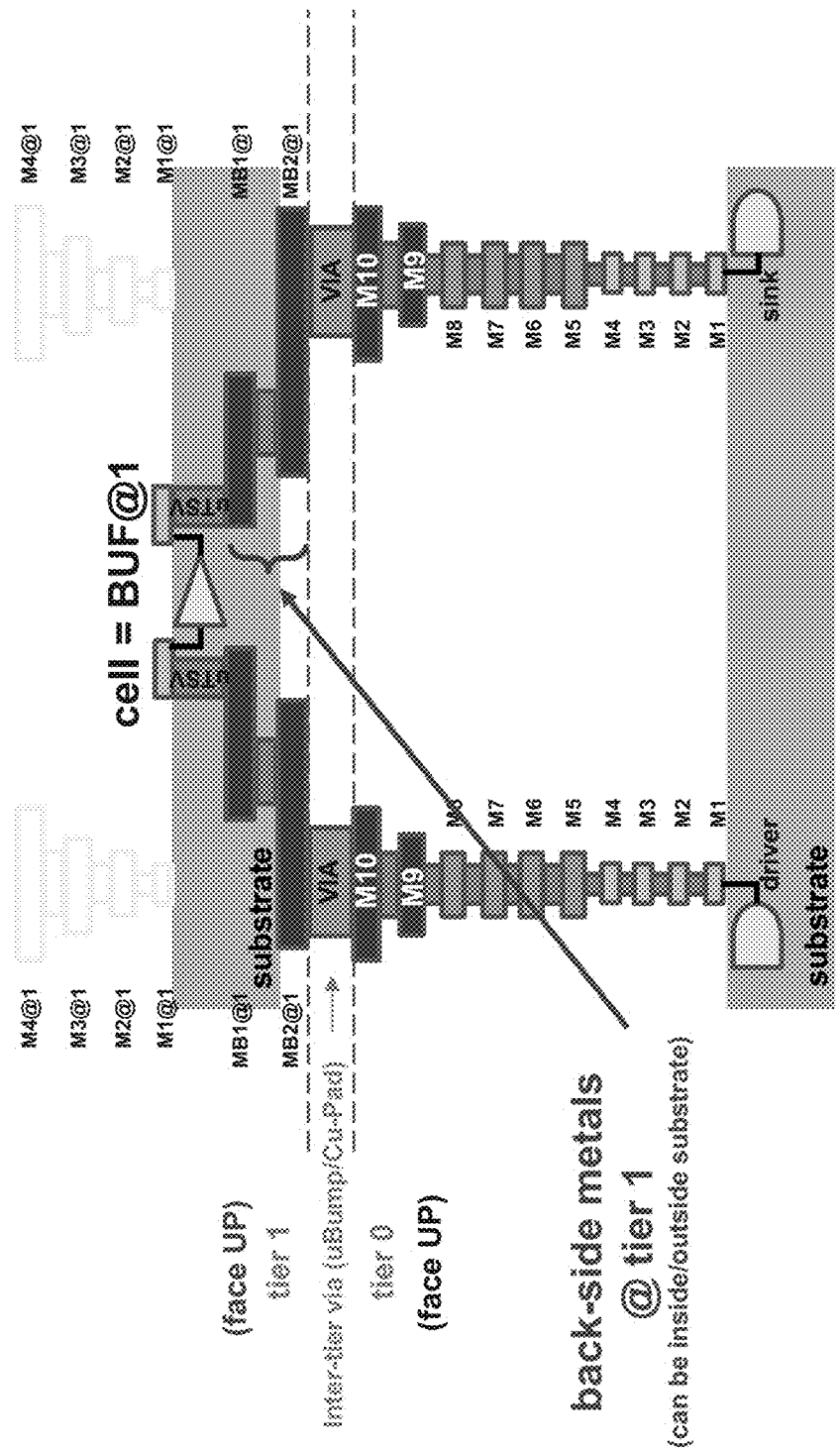

FIGS. 12 and 13 provide example illustrations of 3D-IC face-to-back designs that use the back-side metals of the upper die. Since these are face-to-back designs, this means that the lower die faces the backside of the upper die.

FIG. 12 illustrates face-to-back multi-tier long net routing for the two dies, where routing structures may be utilized on the back-side metals of the upper tier that faces the lower die. In particular, back-side metal layers of the upper tier die are used for routing, where the back-side layers MB1@1 and MB2@1 on the upper tier die 1 are used to implement routing structures. In this particular example it can be seen that the upper tier metal layers M1@1, M2@1, M3@1, and M4@1 are currently not used for routing.

FIG. 13 illustrates face-to-back multi-tier long net buffering, where certain structures may be inserted on the back-side metals of the upper tier. Here, the buffer structures are located on the top substrate face of the upper tier die 1. However, routing structures are located on the back-side metal layers of the substrate of the upper tier die 1 at MB1@1 and MB2@1. This means that that micro TSVs are used to connect the routing structures on the back-side metal layers to the buffering structures on the top face of die 1.

Numerous advances are provided by the various embodiments described herein. For example, with respect to the improved nomenclature (e.g., "cell@tier" and "layer@tier" nomenclature", this approach permits the EDA tool and any associated databases to easily determine the instances and cells at any tier, even when different tiers share the same cell name. Similarly, this permits the tool to easily determine the metal layers at any tier.

In addition, some embodiments implement a preference to utilize upper-tier low-resistance fat/wide metals (front-side and/or back-side) for long net routing. This approach frees up the lower-layer metal resources for routing shorter nets with less congestion.

Moreover, some embodiments provide a preference for utilization of the upper-tier for long net buffering at upper-tier. This is advantageous, for example, because the via stack at upper-tier is not as tall as the lower tier, and hence this approach provides lower resistance and higher performance.

The combination of a regular base die (full metal stack) with the asymmetrical metal stack at upper tier die provides improved cost/performance benefit. The upper-tier die can be made asymmetrical in metal stack, having fewer layers but with mostly low-resistance fat metals which provides performance benefit while reducing the cost of manufacturing the die.

The present approach therefore provides numerous advantages, such as shorter wire lengths. This means that less floorplan size is needed for a single die and less routing detour when connecting the long nets. Another advantage is provided for buffering in high density area, since buffering can be implemented on the top die to cross the high-density area of the bottom die. Moreover, buffering can more easily be implemented over hard macro, since buffering can be provided on the top die to cross the hard macro area of the bottom die. This permits improved buffering which otherwise would normally require the net to detour around the hard macro. In addition, less routing resource consumption is required by minimizing layer promotion. This permits the bottom die to use its routing resource for critical logics, as the buffering can be implemented on the top die. This means that to route the buffers with lower resistance layer, less up-and-down routing is needed on the bottom die. Furthermore, the present approach allows for a lower cost for the metal stack. One die can have full metal stack to accommodate the placement and routing requirements of the most critical part of the logic cells. The other die may have much fewer routing layers for optimization purpose and less critical logic. It gives good balance between performance and cost. Finally, the present approach permits concurrent optimization to be performed. Unlike conventional 3D-IC physical design, the new technology described herein optimizes both dies concurrently with one optimizer, and that optimization can be timing driven.

System Architecture Overview

Figure 14:
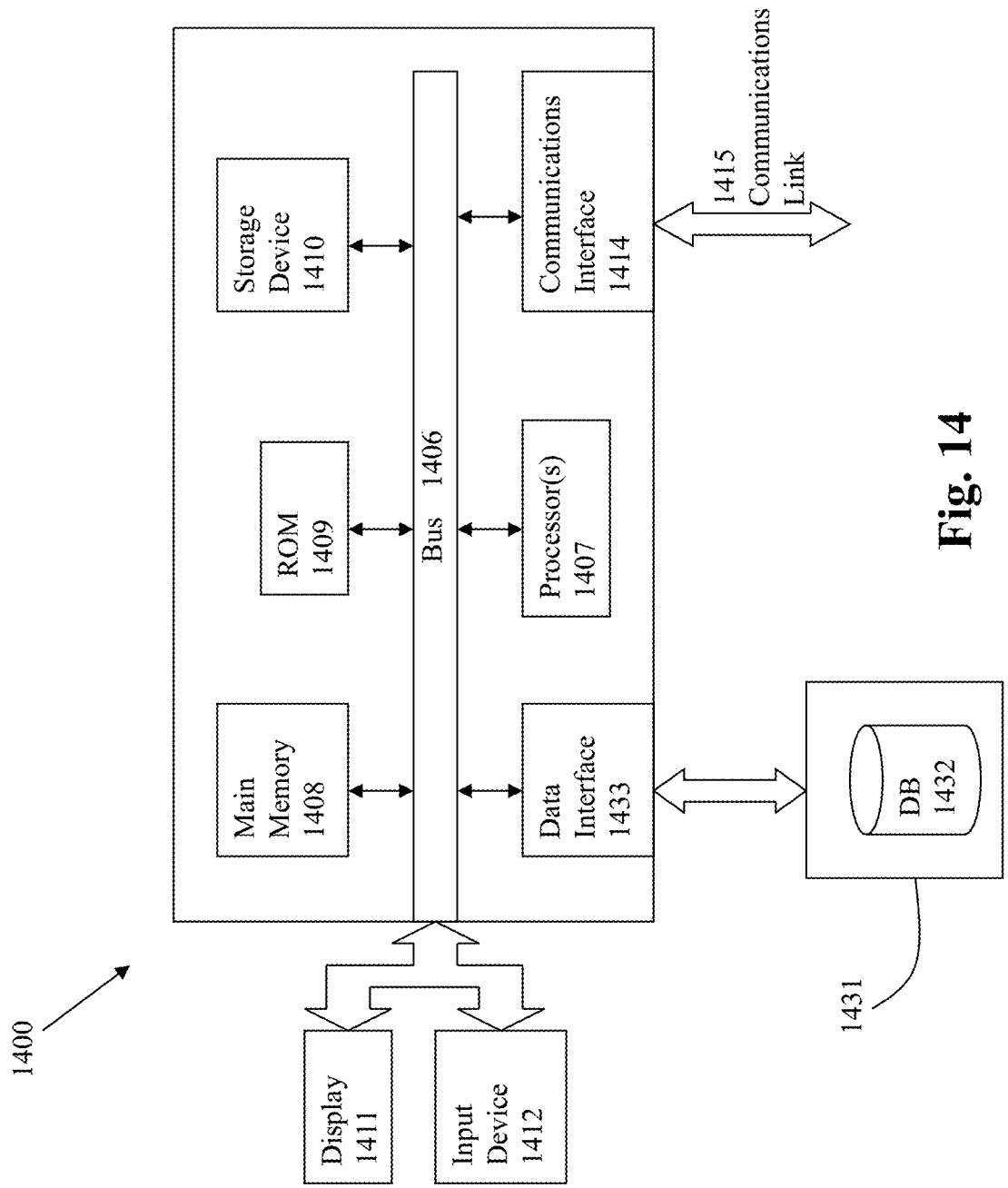
FIG. 14 depicts a computerized system on which some embodiments of the invention can be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
    identifying electronic design data of a three-dimensional (3D) electronic design;
    identifying multiple integrated circuit (IC) tiers in the 3D electronic design, wherein a respective IC tier of the multiple IC tiers corresponds to a respective die having one or more respective layers;
    implementing a physical design for the electronic design data with concurrent physical implementation on the multiple IC tiers at least by modeling, in a 3D design space, physical implementation resources provided in the multiple IC tiers for implementing the 3D electronic design, wherein concurrent routing is performed without splitting a netlist of the electronic design; and storing the physical design into a physical design file.

2. The method of claim 1, in which the concurrent physical implementation is performed by:

performing a cost calculation, wherein the concurrent physical implementation comprises concurrent placement, concurrent routing, or concurrent optimization across multiple corresponding dies that respectively correspond to the multiple IC tiers;

performing a placement and/or routing iteration on the multiple IC tiers; and performing another iteration of performing the cost calculation and performing the placement and/or routing if a target criterion is not yet met.

3. The method of claim 2, wherein the target criterion comprises at least one of meeting a timing requirement or reaching a stop criterion.

4. The method of claim 1, wherein the multiple IC tiers are arranged face-to-face, face-to-back, or back-to-back.

5. The method of claim 1, wherein multiple layers from each of the multiple IC tiers are combined into a single set of layers to be considered together for the concurrent physical implementation.

6. The method of claim 1, wherein a design database is implemented, and where a given layer is labelled having a format corresponding to at least one of cell@tier number or layer@tier number.

7. The method of claim 1, wherein the concurrent physical implementation is performed at least by:

performing resource collection for an upper tier;
performing cost assessment at the upper tier;
performing layer assignment at the upper tier;
performing resource collection for a lower tier located under the upper tier;
performing layer assignment at the lower tier; and
routing the upper and lower tiers based upon one or more cost assessments.

8. A computer program product embodied on a non-transitory computer readable medium having stored thereon a sequence of instructions which, when executed by a processor, causes the processor to execute a set of acts, the set of acts comprising:

identifying electronic design data of a three-dimensional (3D) electronic design;

identifying multiple integrated circuit (IC) tiers in the 3D electronic design, wherein a respective IC tier of the multiple IC tiers corresponds to a respective die having one or more respective layers;

implementing a physical design for the electronic design data with concurrent physical implementation on the multiple IC tiers at least by modeling, in a 3D design space, physical implementation resources provided in the multiple IC tiers for implementing the 3D electronic design, wherein concurrent routing is performed without splitting a netlist of the electronic design; and storing the physical design into a physical design file.

9. The computer program product of claim 8, in which the concurrent routing is performed by:

performing a cost calculation, wherein the concurrent physical implementation comprises concurrent placement, concurrent routing, or concurrent optimization across multiple corresponding dies that respectively correspond to the multiple IC tiers;

performing a placement and/or routing iteration on the multiple IC tiers; and performing another iteration of performing the cost calculation and performing the placement and/or routing if a target criterion is not yet met.

10. The computer program product of claim 9, wherein the target criterion comprises at least one of meeting a timing requirement or reaching a stop criterion.

11. The computer program product of claim 8, wherein the multiple IC tiers are arranged face-to-face, face-to-back, or back-to-back.

12. The computer program product of claim 8, wherein multiple layers from each of the multiple IC tiers are combined into a single set of layers to be considered together for the concurrent physical implementation.

13. The computer program product of claim 8, wherein a design database is implemented, and where a given layer is labelled having a format corresponding to at least one of cell@tier number or layer@tier number.

14. The computer program product of claim 8, wherein the concurrent physical implementation is performed at least by:

performing resource collection for an upper tier;
performing cost assessment at the upper tier;
performing layer assignment at the upper tier;
performing resource collection for a lower tier located under the upper tier;
performing layer assignment at the lower tier; and
routing the upper and lower tiers based upon one or more cost assessments.

15. A system, comprising:

a processor;
a memory for holding programmable code; and
wherein the programmable code includes instructions which, when executed by the processor, cause the processor to perform a set of acts, the set of acts comprising:

identifying electronic design data of a three-dimensional (3D) electronic design;

identifying multiple integrated circuit (IC) tiers in the 3D electronic design, wherein a respective IC tier of the multiple IC tiers corresponds to a respective die having one or more respective layers;

implementing a physical design for the electronic design data with concurrent physical implementation on the multiple IC tiers at least by modeling, in a 3D design space, physical implementation resources provided in the multiple IC tiers for implementing the 3D electronic design, wherein concurrent routing is performed without splitting a netlist of the electronic design; and storing the physical design into a physical design file.

16. The system of claim 15, in which the concurrent physical implementation is performed by:

performing a cost calculation, wherein the concurrent physical implementation comprises concurrent placement, concurrent routing, or concurrent optimization across multiple corresponding dies that respectively correspond to the multiple IC tiers;

performing a placement and/or routing iteration on the multiple IC tiers; and performing another iteration of performing the cost calculation and performing the placement and/or routing if a target criterion is not yet met.

17. The system of claim 16, wherein the target criterion comprises at least one of meeting a timing requirement or reaching a stop criterion.

18. The system of claim 15, wherein the multiple IC tiers are arranged face-to-face, face-to-back, or back-to-back.

19. The system of claim 15, wherein multiple layers from each of the multiple IC tiers are combined into a single set of layers to be considered together for the concurrent physical implementation.

20. The system of claim 15, wherein a design database is implemented, and where a given layer is labelled having a format corresponding to at least one of cell@tier number or layer@tier number.

21. The system of claim 15, wherein the concurrent physical implementation is performed at least by:
- performing resource collection for an upper tier;
- performing cost assessment at the upper tier;
- performing layer assignment at the upper tier;
- performing resource collection for a lower tier located under the upper tier;
- performing layer assignment at the lower tier; and
- routing the upper and lower tiers based upon one or more cost assessments.

\* \* \* \* \*